UNITED STATES PATENT OFFICE.

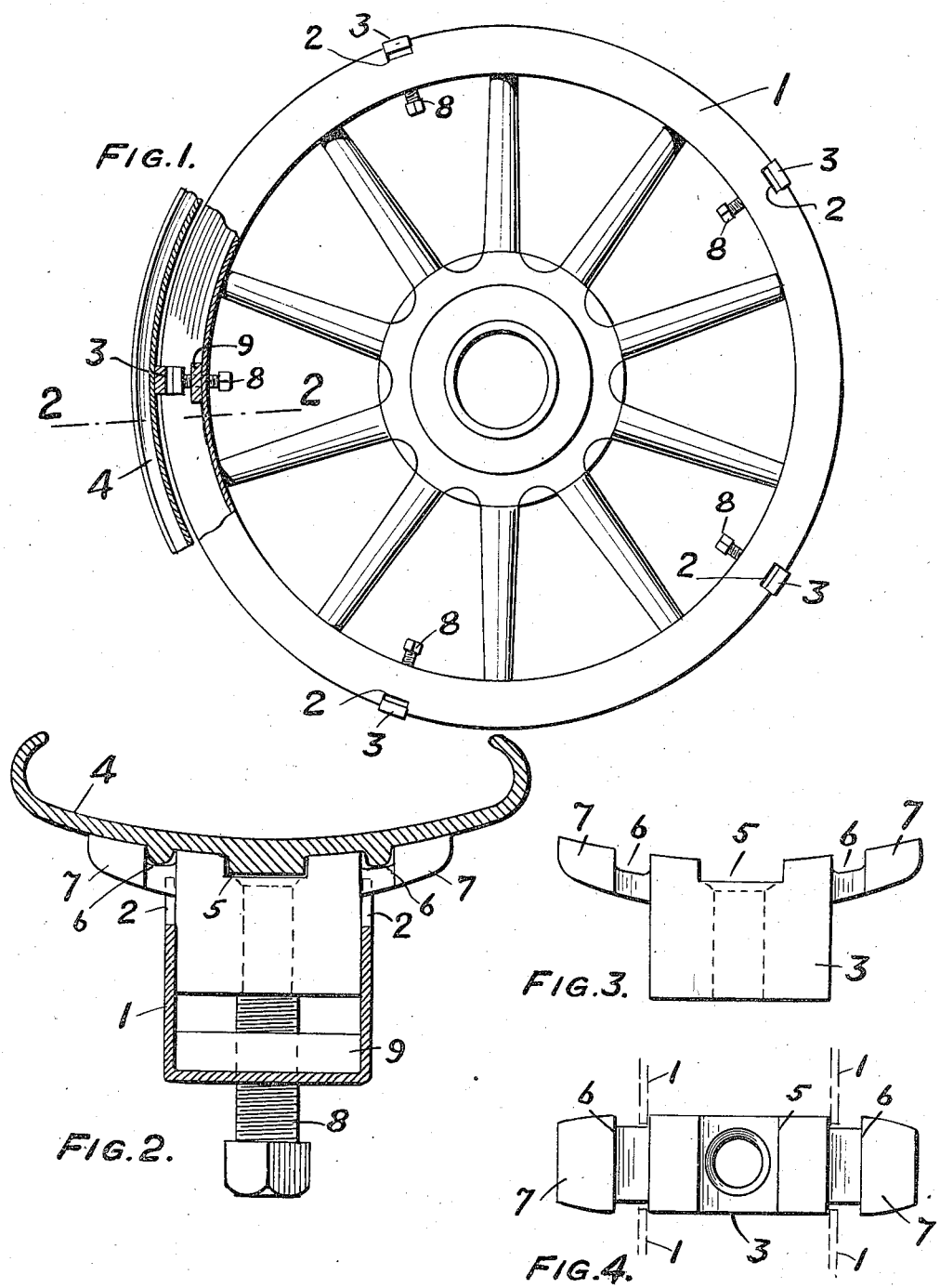

CHARLES EDWARD CAMERON, OF COLLINGSWOOD, NEW JERSEY, ASSIGNOR OF ONE-HALF TO WILLIAM L. HURLEY, OF CAMDEN, NEW JERSEY.

WHEEL.

1,227,995.  Specification of Letters Patent.  Patented May 29, 1917.

Application filed May 16, 1916. Serial No. 97,845.

*To all whom it may concern:*

Be it known that I, CHARLES E. CAMERON, a citizen of the United States, and a resident of Collingswood, in the county of Camden and State of New Jersey, have invented certain new and useful Improvements in Wheels, of which the following is a specification.

The principal object of the present invention is to provide comparatively simple and efficient means for properly connecting a felly ring and a demountable rim while at the same time affording means by which the demountable rim can be readily removed and applied.

The invention will be claimed at the end hereof, but will be first described in connection with the accompanying drawings forming part hereof and in which—

Figure 1, is a side view of a wheel embodying features of the invention.

Fig. 2, is a sectional view taken on the line 2—2 of Fig. 1, and

Figs. 3 and 4, are respectively end and plan views of one of the saddles for the demountable rim.

The fixed rim 1 is provided with alined notches 2. As shown the felly consists of a metal ring of channel shape in section with its flanges arranged outward and the notches 2 are formed in the flanges. 3 is a saddle extending across the face of the rim and projecting beyond its edges. Several such saddles are employed, but a description of one will suffice. The face of the saddle is symmetrical and conforms to the inner surface of the demountable rim 4 and it may be notched as at 5 and 6 to accommodate ribs that may be present on the inner face of the demountable rim. The saddle comprises a body portion having projecting ears 7 and to which is connected, for turning but not endwise motion, a bolt 8. The shank of the bolt passes through the fixed rim and its thread engages a thread on the fixed rim or on a threaded block 9 secured thereto.

To apply the demountable rim, the bolts are turned so as to draw the saddles toward the center of the wheel and the demountable rim 4 may be applied from either side of the wheel. Then the bolts are turned so as to project the saddles and when this is done they exert pressure on the inside of the demountable rim 4 in radial direction only, it being understood that the face of the saddle conforms in shape to the shape of the inner surface of the rim and thus the rim is firmly held even though subjected to radial pressure only.

What I claim is:

1. In a wheel the combination of a fixed rim consisting of a channel section provided in its flanges with alined notches, demountable rim-saddles each provided with ears arranged in one pair of said alined notches and each having its body portion arranged between the flanges, and screws each interposed between the fixed rim and one of the saddles.

2. In a wheel the combination of a fixed rim consisting of a channel section provided in its flanges with alined notches, demountable rim-saddles each provided with ears arranged in one pair of said alined notches and each having its body portion arranged between the flanges, and screws each interposed between the fixed rim and one of the saddles, and the confronting surfaces of the saddles and demountable rim being ribbed and grooved for mutual engagement.

CHARLES EDWARD CAMERON.